United States Patent
Barilli et al.

(10) Patent No.: US 11,187,588 B2
(45) Date of Patent: Nov. 30, 2021

(54) GEOMETRIC AND RADIOMETRIC CALIBRATION AND TEST APPARATUS FOR ELECTRO-OPTICAL THERMAL-IR INSTRUMENTS AND DESIGNED TO SIMULATE DIFFERENT ANGULARLY-EXTENDING THERMAL-IR SOURCES WITH DIFFERENT GEOMETRIES AND WITH THERMAL-IR EMISSIONS CONTAINING DIFFERENT HOT-COLD TRANSITIONS

(71) Applicant: LEONARDO S.P.A., Rome (IT)

(72) Inventors: Marco Barilli, Rome (IT); Stefano Brogi, Rome (IT)

(73) Assignee: LEONARDO S.P.A., Rome (IT)

( * ) Notice: Subject to any disclaimer, the term of this patent is extended or adjusted under 35 U.S.C. 154(b) by 8 days.

(21) Appl. No.: 16/637,582

(22) PCT Filed: Aug. 9, 2018

(86) PCT No.: PCT/IB2018/056010
§ 371 (c)(1),
(2) Date: Feb. 7, 2020

(87) PCT Pub. No.: WO2019/030705
PCT Pub. Date: Feb. 14, 2019

(65) Prior Publication Data
US 2020/0256736 A1    Aug. 13, 2020

(30) Foreign Application Priority Data
Aug. 9, 2017  (EP) .................................... 17425088

(51) Int. Cl.
*G01J 5/08*    (2006.01)
*G01J 5/04*    (2006.01)
*G01J 5/52*    (2006.01)

(52) U.S. Cl.
CPC ............. *G01J 5/0806* (2013.01); *G01J 5/047* (2013.01); *G01J 5/0831* (2013.01); *G01J 5/522* (2013.01)

(58) Field of Classification Search
CPC ........ G01J 5/0806; G01J 5/047; G01J 5/0831; G01J 5/522; G01J 5/524; G01J 5/0809
See application file for complete search history.

(56) References Cited

U.S. PATENT DOCUMENTS 4,626,685 A * 12/1986 Pitalo .................... G01M 11/00
                                                        250/341.6
4,832,451 A    5/1989 Trescott
(Continued)

FOREIGN PATENT DOCUMENTS

GB         2517068 A      2/2015

OTHER PUBLICATIONS

International Search Report and Written Opinion for PCT/IB2018/056010, dated Feb. 14, 2019.

*Primary Examiner* — Marcus H Taningco
(74) *Attorney, Agent, or Firm* — Dorsey & Whitney LLP

(57) ABSTRACT

A geometric and radiometric calibration and test apparatus for electro-optical thermal-IR (8-12 micron) instruments and designed to simulate angularly-extending thermal-IR sources with different geometries and with thermal-IR emissions containing hot-cold transitions. The apparatus comprises an IR collimator having an optical axis and a focal plane; a thermal-IR source movable relative to the collimator to be controllably arrangeable and displaceable in the focal plane of the collimator, and operable to radiate thermal-IR radiations towards the collimator; and a kit of masks interchangeably arrangeable in front of the thermal-IR source and having geometric and radiometric properties to cause the thermal-IR radiation reproduced on the electro- (Continued)

optical instrument to be calibrated or tested to contain different hot-cold transitions.

10 Claims, 3 Drawing Sheets

(56) References Cited

U.S. PATENT DOCUMENTS

| | | | | |
|---|---|---|---|---|
| 5,265,958 A | * | 11/1993 | Ludlow | G01J 5/522 |
| | | | | 250/252.1 |
| 5,756,991 A | * | 5/1998 | Risinger | F41J 2/02 |
| | | | | 250/252.1 |
| 5,926,279 A | * | 7/1999 | Bijl | G01J 5/522 |
| | | | | 356/388 |
| 6,414,305 B1 | * | 7/2002 | Bendall | G01J 5/522 |
| | | | | 250/252.1 |
| 8,593,622 B1 | * | 11/2013 | Streuber | G01J 9/00 |
| | | | | 356/124 |
| 2017/0016771 A1 | | 1/2017 | Koresko | |

\* cited by examiner

GEOMETRIC AND RADIOMETRIC CALIBRATION AND TEST APPARATUS FOR ELECTRO-OPTICAL THERMAL-IR INSTRUMENTS AND DESIGNED TO SIMULATE DIFFERENT ANGULARLY-EXTENDING THERMAL-IR SOURCES WITH DIFFERENT GEOMETRIES AND WITH THERMAL-IR EMISSIONS CONTAINING DIFFERENT HOT-COLD TRANSITIONS

CROSS-REFERENCE TO RELATED PATENT APPLICATIONS

This application is a 35 U.S.C. § 371 National Stage Application of PCT Application No. PCT/IB2018/056010, filed Aug. 9, 2018, which claims priority of European Patent Application No. 17425088.6 filed on Aug. 9, 2017, the entire contents of which are hereby incorporated by reference, in their entirety, for any purposes.

TECHNICAL FIELD OF THE INVENTION

The present invention concerns a geometric and radiometric calibration and test apparatus for electro-optical thermal-IR instruments and designed to simulate angularly-extending thermal-IR sources with different geometries and with thermal-IR emissions containing different hot-cold transitions.

This apparatus constitutes an improved solution for the production of geometric and radiometric calibration and test equipment, generally known as Optical Ground Support Equipment (OGSE).

This type of OGSE finds advantageous, although not exclusive, application in the production of electro-optical instruments for Assembly Integration and Test (AIT) and Assembly Integration and Verification (AIV) activities in the space/satellite and defence fields.

STATE OF THE ART

Nowadays, OGSE is widely used for geometrically and radiometrically calibrating and testing electro-optical thermal-IR instruments developed both in the space and in the defence fields.

Most known OGSE uses collimators based on offset parabolas and operate, as a general rule, by projecting, from infinity, an EM point source, commonly known as a source point, the image of which is then processed by the testing system with algorithms for position fixing/image identification and radiation signal measurement. In fact, the source point materializes an elementary source, taking into account that any angularly-extending object can be mathematically represented by the convolution of several source points.

The convolution approach, in principle correct, has significant effects in terms of accuracy, reducing the test to virtual mathematical modelling and not, as is often requested, a direct measurement with optical stimulus, thus deferring the real operational check of the performance to the field test.

The method of projecting the source point from infinity, although general from the mathematical standpoint, is not actually easy to use for defining radiometric scenarios that are very complex, static or variable over time and in the angular directions.

Many known OGSE is equipped with external scanning systems, made with rotating platforms or, in more complex cases, integral with hexapod platforms, in order to scan Units Under Test (UUTs) under different angles of the projected points.

This entails, on one hand, the use of expensive and accurate movement systems, in relation to the weight and bulk of the OGSE and/or UUTs, and, on the other hand, the need to recalibrate the UUTs based on the mutual position between the illuminators and the UUTs, because the systems are often subject to the perturbing effects of the system itself and of the environment.

Some OGSE also exists that reproduces angularly-extending IR sources with sharp hot-cold transitions.

However, such OGSE appear to be both hardly reconfigurable for different scenarios and hardly usable in dynamic situations.

OBJECT AND SUMMARY OF THE INVENTION

In the field of OGSE, the need is felt to develop methodologies and apparatuses of growing complexity for the geometric and radiometric calibration and testing of electro-optical instruments operating in the infrared-thermal band.

In fact, while up until a few years ago test and calibration surveys were carried out when an electro-optical instrument was delivered and were generally limited to basic functional tests, today, due to an increasingly competitive scenario, instances of optical characterization of borderline situations, albeit operative and real, clearly emerge.

To give a few examples:

electro-optical attitude sensors for satellite use, for example on board Low Earth Orbit (LEO) satellites, are known that allow the attitude of a satellite passing over a stretch of land at low altitude (between 400 and 850 km) to be determined. This operating scenario has forced a substantial reassessment of the observation geometries and the radiometric characteristics of existing OGSE. In fact, at low altitudes, the land strip appears geometrically wide and, in contrast with the surrounding cold space, its thermal-IR emission is highly modulated by oblique viewing factors;

in the avionics field, complex radiometric characterization surveys might become necessary for electro-optical thermal-IR instruments in order to perform optical measurements in the presence of high temperature gradients superimposed on the observed scene.

In general, these circumstances, where the checks of performances of electro-optical thermal-IR instruments during operating conditions at the limit of the optical measurement methodologies are requested, have led the Applicant to reconsider illumination methods and the associated equipment for extending radiometric test and calibration configurations to complex operating circumstances.

The object of the present invention is to provide an innovative geometric and radiometric calibration and test apparatus for electro-optical thermal-IR instruments suitable for the accurate (in the geometric and radiometric sense) reproduction of one or more hot-cold transitions in a real scenario.

This object is achieved by the present invention in so far as it relates to a geometric and radiometric calibration and test apparatus for electro-optical thermal-IR instruments and designed to simulate angularly-extending thermal-IR sources with different geometries and with emissions containing hot-cold transitions, as defined in the appended claims.

DETAILED DESCRIPTION OF PREFERRED EMBODIMENTS OF THE INVENTION

The following description is provided to allow a skilled person in the field to implement and use the invention. Various modifications to the embodiments shown will be immediately obvious to experts and the generic principles described herein could be applied to other embodiments and applications without departing from the scope of protection of the present invention as defined in the appended claims. In consequence, the present invention is not intended to be limited to just the embodiments set forth herein, but is to be accorded the widest scope consistent with the principles and features disclosed herein and defined in the appended claims.

Figure 1:
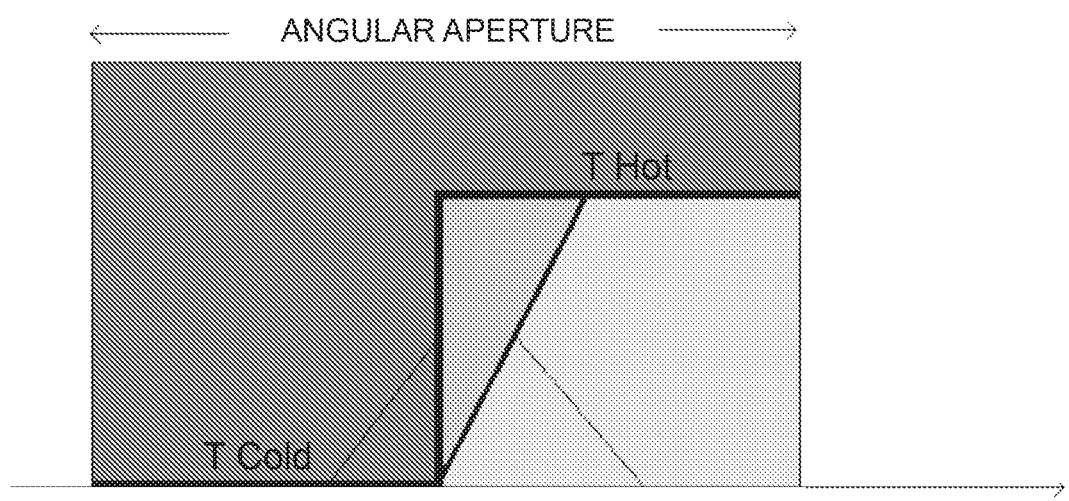
FIG. 1 shows a thermal emission of an angularly-extending, thermal-IR source with a thermal-IR emission containing a hot-cold transition.

FIG. 1 schematically shows a thermal-IR emission of an angularly-extending thermal-IR source in a context where it is statically projected on an electro-optical instrument, or dynamically moved relative thereto, and in which there is a hot-cold transition between two (or more) different temperatures, designated as Thot and Tcold, respectively, the relative intensities of which can have a variable relation, both in terms of relative intensities and of the transition therebetween. In greater detail, FIG. 1 shows an example of a thermal-IR emission containing a sharp (diffractive) hot-cold transition (unbroken line) and a modulated hot-cold transition, in particular a linear one (broken line).

The present invention concerns a geometric and radiometric calibration and test apparatus for thermal-IR (8÷16 µm) UUTs, for example those intended to be installed on satellites or aircraft, and designed to simulate angularly-extending thermal-IR sources with different geometries and with emissions containing hot-cold transitions.

The design provides the apparatus with flexibility in angular and geometric morphology, in radiometry, and in the movement of the thermal-IR source.

In a nutshell, the present invention provides a geometric and radiometric calibration and test apparatus comprising a telecentric wide-angle collimator on the focal plane of which a thermal-IR source is arranged. The source is spatially movable to be positionable and freely movable on the focal plane of the collimator and, expediently, to be also movable along the optical axis of the collimator to compensate for variations in focal length as the ambient temperature and the position of the UUT relative to the source, and also to simulate the response of the UUT to the vibrations of the platform on which the UUT is installed. An accompanying kit of easily interchangeable masks is also provided, each of which acts as a projected object that provide the wavefront of the thermal-IR radiations emitted by the thermal-IR source with geometric and radiometric properties such as to cause the thermal-IR radiations reproduced on the UUT's entrance pupil to contain different the hot-cold transition morphologies.

The invention is therefore assimilable to a high-quality IR projector, where the angular extension of the thermal-IR emission is apodizable depending on the masks' shapes and on the law of motion that the source movement mechanism can induce to simulate the operating conditions of dynamic, i.e. temporally transitory, phenomena.

In the case of angularly-extending sources with different geometries, the present invention significantly broadens the fields of application of existing point projectors, with the possibility of reproducing dynamic scenarios in small, thermally-controlled spaces.

The geometric and radiometric calibration and test apparatus of the present invention enables real scenarios to be reproduced in terms of radiative contrast and related trajectories, which is difficult and laborious to reduce to simple operations of mathematical convolution of point sources.

A method of illumination and a geometric and radiometric calibration and test apparatus suitable for industrial use in AIV/AIT lines for the production, calibration and testing of electro-optical thermal-IR instruments, for example, instruments intended to be installed on satellites or apparatuses in the defence sector, will now be described according to a preferred, but not limitative, embodiment of the invention.

In the preferred embodiment shown in FIGS. 2, 3 and 4, the geometric and radiometric calibration and test apparatus 1 is designed to illuminate an inlet aperture, indicated hereinafter by the term "entrance pupil", of a UUT with angularly-extending thermal-IR radiation containing a hot-cold transition.

To illuminate the UUT with an angularly-extending thermal-IR radiation containing a hot-cold transition, the geometric and radiometric calibration and test apparatus 1 comprises:

a thermal-IR collimator 2 (also referred hereinafter to as projector) having an optical axis Z and a focal plane F arranged on the opposite side of the collimator 2 with respect to the UUT's entrance pupil to be illuminated, a thermal-IR source 3 controllably movable relative to the collimator 2 to be arrangeable and displaceable on the focal plane F of the collimator 2, and expediently also displaceable along the optical axis Z of the collimator 2, and operable to radiate thermal-IR radiations towards the collimator 2, and a kit of interchangeable masks 4, also known as targets, selectively and removably arrangeable in front of the thermal-IR source 3, so as to be integrally movable therewith, and having geometric and radiometric properties such as to cause the thermal-IR radiation reproduced on the UUT's entrance pupil to contain different hot-cold transitions.

The collimator 2 comprises telecentric collimating optics comprising a pair of spherical positive meniscus lenses orientated such that the concave surfaces face towards the thermal-IR source 3 and towards the UUS's entrance pupil, respectively.

The meniscus lenses are expediently made of a high electrical and thermal conductivity optical germanium, for example n-doped optical-grade germanium, expediently with resistivity not higher than 3 ohm/cm, with a wide-band non-reflective treatment.

The collimator 2 has an effective focal length f and a field angle 1, the entrance pupil is placed at a distance q from the vertex of the closest lens, and the lenses are physically set apart at a distance d. X and Y are the tangential and sagittal directions normal to the optical axis Z.

The collimator 2 is so sized as to be telecentric, i.e. such that every emitting point in its focal plane is projected on the UUT's entrance pupil with the same solid angle for each direction, thereby forming a constant radiometric flux as the field angle changes.

It should be appreciated that, in the detail of the entrance pupil's dislocation, significantly different portions of the optics work at different directions, such portions being constituted by portions of a sphere identifiable by a certain height, indicated by r and referring to the point of intersection of the "chief ray" of the current field with respect to the line containing the optical axis of the collimating optics. This is combined with the specific requirement of using a high thermal and electrical conductivity germanium so as to minimize the creation of spatial thermal gradients that would alter the intensity of the radiation produced as a function of the emission angle.

This configuration, with optical characteristics at the diffraction limits of the 8-16 micron band, functions as a collimator of a circular area with radius R=f*tg($\Omega$/2), with f variable based on the chosen configuration and between 100 and 1000 mm, usable with field angles $\Omega$ up to 60° for focal lengths in the order of 100 mm, and, in the case of focal lengths of around a metre, up to approximately 20° overall.

Figure 2:
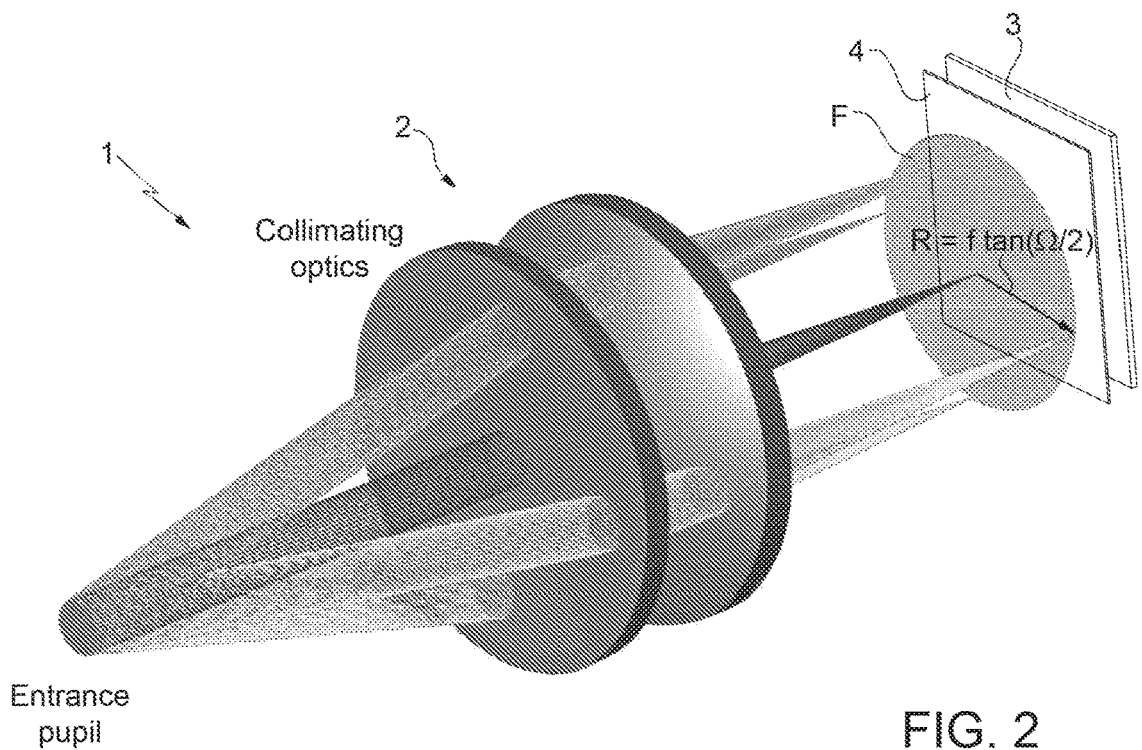
FIG. 2 is a 3D representation of a geometric and radiometric calibration and test apparatus for electro-optical thermal-IR instruments according to a preferred embodiment of the present invention.
Figure 3:
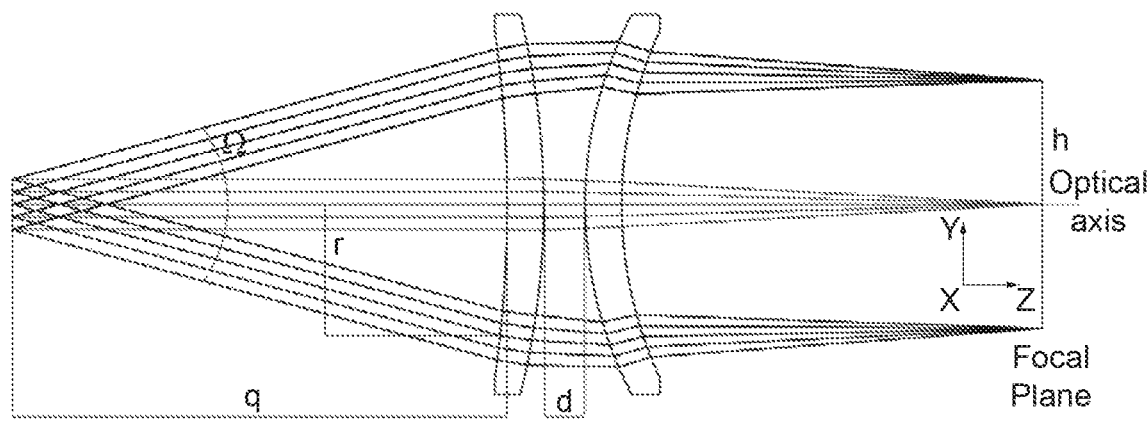
FIG. 3 shows an optical diagram of a telecentric IR collimator forming part of the apparatus shown in FIG. 2.

The collimator shown in FIG. 2 is sized to respect the specifications of OGSE designed for an electro-optical instrument for spatial application, equipped with the following first-order characteristics:

effective focal length—f=203 mm,
total field angle—$\Omega$=40° (+/−20°), and
image plane size 2*R=150 mm approx.

It should be appreciated that the above-indicated numerical data fails to represent a limitation on the concepts set forth and only represents an example of reduction to practice, it being clear that other numerical configurations may be expediently adopted.

The collimator 2 is kept at a constant temperature just above the ambient temperature, stable within 0.5° C., in order to ensure the repeatability of the radiometric quantity measurements by the UUT.

The thermal-IR source 3 is designed such that:
it can be mounted on a translational platform (not shown), expediently motorized, movable in the X and Y directions and, expediently, in the Z direction, which directions define a local orthogonal Cartesian reference system (machine coordinates system in jargon),
it is thermally uncoupled to the collimator 2, and
it is thermally stable.

In one embodiment suitable for spatial applications, in particular LEO satellite applications, the thermal-IR source 3 may expediently be, but is not limited to being, made by means of a Peltier cell having a hot side facing the meniscus lenses of the collimator 2, and may expediently be, but is not limited to being, made of a high thermal conductivity glass-ceramic material.

The position of the thermal-IR source 3 may expediently be controlled by a computer programmed with an opportune dedicated software program.

The thermal stability may be achieved for example by equipping the thermal-IR source 3 with an adequate heat dissipation structure, integral with the thermal-IR source 3.

Figure 4:
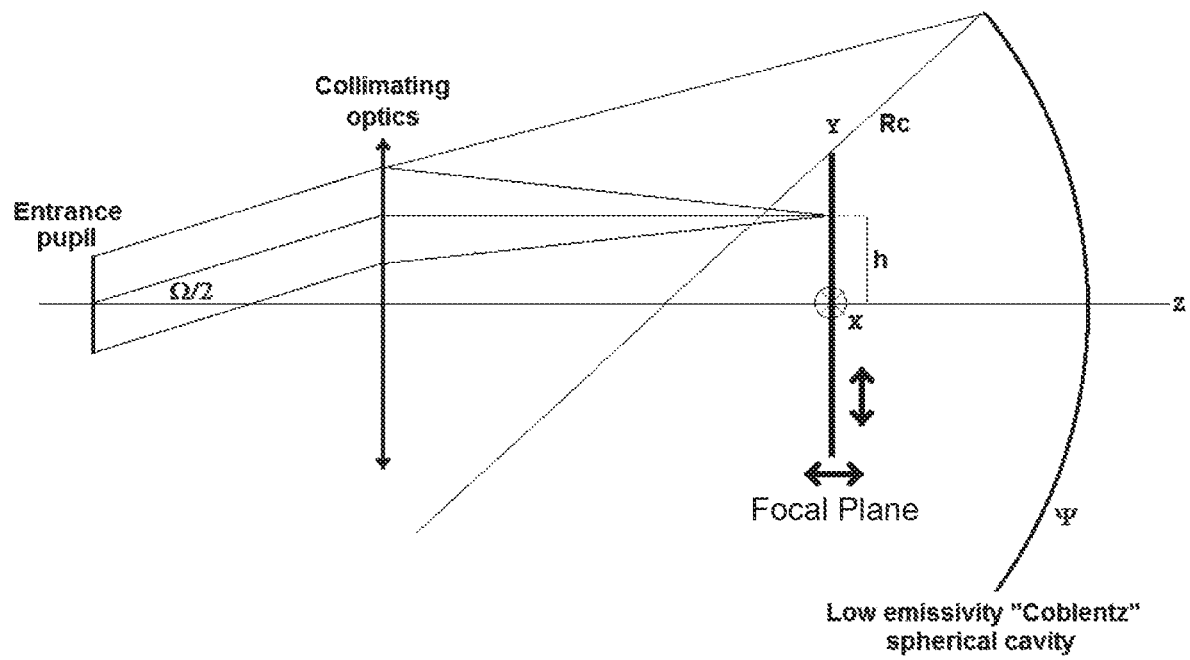
FIG. 4 shows an optical diagram of a paraxial approximation of the apparatus shown in FIG. 2.

FIG. 4 outlines the structure of the thermal-IR source 3, and shows the presence of a specular concave surface (i.e., with low emissivity in the thermal-IR band) integral with the thermal-IR source 3, so at to move therewith. The specular concave surface performs the dual function of heat dissipator for the thermal-IR source 3, and, above all, due to the fact that it is provided with a concave radius of curvature, i.e. provided with optical powers, acts like a Coblenz cavity that condenses the thermal-IR radiation emitted by the collimator 2, thus contributing to the creation of a "cold background" with respect to the thermal-IR source 3. In other words, assuming that the thermal-IR source 3 is implemented by means of a Peltier cell with a hot side facing the collimator 2 and a cold side facing this concave surface, the latter will be sized (this meaning the radius of curvature and its relative position relative to the cold side of the cell) such that the thermal-IR radiation emitted by the collimator 2 is condensed on the cold side of the Peltier cell, which in this circumstance acts as a simple "mirror" that observes a cold trap (i.e. the side facing the cell's lenses).

The entire opto-mechanical system must thus expediently comprise hollow walls provided with opportune baffles, to allow the flow of a fluid for thermos-regulating the lenses and the mechanical structure of the illuminator, for example, from an external chiller.

A computer and dedicated software, an integral part of the equipment, thermally controls the thermal-IR source 3.

The kit of masks 4 to be interchangeably coupled to the thermal-IR source 3 is formed by a series of rolled metal sheets that are appropriately perforated to provide the thermal-IR source 3 with geometries suitable for reproducing an angular apodization of the IR wavefront projected by the system to infinity.

The masks 4 may, for example, have lateral dimensions of roughly 150÷200 mm, and may be made using a thin metal substrate, for example 100-200 μm, in particular, ferromagnetic for easy application to the thermal-IR source 3 by means of anchoring magnets opportunely arranged on the opposite side of the thermal-IR source 3, namely that facing the Coblenz cavity, so resulting in the accessory mechanics needed for fixing the masks 4 to the thermal-IR source 3 being not seen by the collimator 2.

The masks may be provided with any geometric shape suitable for reproducing an angular apodization. To mention a few simple examples, the masks 4 may be perforated in such way as to simulate:

A: an angularly-extending source with a sharp hot/cold transition,
B: a point source,
C: a modulated source having a cosine-type projective function that, for example, may be obtained by moving the focal plane F along the direction of the long side of the hole's elliptical profile,
D: a multipoint source that enables better placement of the focal plane F, simultaneously in several points of the UUT's FOV (Field of View),
E: a multi-pattern source for Modulation Transfer Function (MTF) measurements, i.e., a contrast function at different spatial frequencies, and
F: more in general, any morphology suitable for reproducing an outline of any target.

The useful surface of the masks 4 is such as to ensure, with a margin, that the movement of the thermal-IR source 3 is within the effective UUT's FOV "w".

It is to be emphasized the set-up's flexibility, which, depending on the morphology of the masks 4 and their variable positions resulting from movement of the thermal-IR source 3, allows thermal-IR emissions with hot-cold transitions with known transition-modulated apodization characteristics to be reproduced on the entrance pupil.

These transitions may, in fact, be acquired by the UUT:
both in a static mode, in which a mask 4 is stationary during acquisition according to its specific morphology, and
in a controlled dynamic mode, in which a mask 4 is in motion during acquisition, thus reproducing the effect of acquisition of a transition in moving scenarios.

Among the possible solutions, that of producing the masks 4 in a ferromagnetic material, preferably with photolithographic methods to ensure accuracy of the geometric morphologies, with stable mechanical interfaces with the movable platform, is the one that appeared the most suitable for ensuring the correct profiling of the masks 4 and good thermal contact with the Peltier cell, which is made of a glass-ceramic material, with one or more permanent magnets located opposite to the optics (and hidden from view) for stably releasably coupling the masks 4 to the Peltier cell, thereby avoiding the use of screws, adhesives, etc., which might alter the scenario and have a negative effect on the calibration and testing of UUTs.

Modulation of the relative intensities between the hot and cold parts is instead obtained by:

adjusting the temperature of the Peltier cell via a current control, and adjusting the intrinsic emissivity characteristics of the material chosen for making the masks 4 (for example, alloys in ferritic steels that, among other things, possess the quality of exhibiting very low emissivity (<1%) in the thermal-IR band and heat conductivity characteristics similar to those of copper, can be expediently used).

With regards to the calibration of OGSE containing an apparatus 1 according to the present invention, usually when trying to describe the qualities/potentialities in the presentation phase, often little or nothing is said in relation to the calibration techniques or methodologies and/or its characterization.

To put it briefly, it is taken for granted that the OGSE, as manufactured, maintains stable geometric-radiometric characteristics over time. On the contrary, as a "standard metre", i.e., a radiometric and geometric reference, an apparatus with moving and emissive parts, it is necessary that it is subjected to periodic servicing or calibration, the most important of which are, in order of importance, of a radiometric type and a geometric type.

Radiometric calibrations are those ascribed to the thermal-IR source 3 source only, statically intended, substantially to be carried out through the use of calibrated IR radiometers. The emissive elements are, by their nature, susceptible to deterioration, oxidation, and contamination from dust or simply from handling. Therefore, the OGSE is preferably equipped with suitable housings for protection against environmental contamination, and is preferably designed to be easily cleanable, interchangeable and maintainable.

Figure 5:
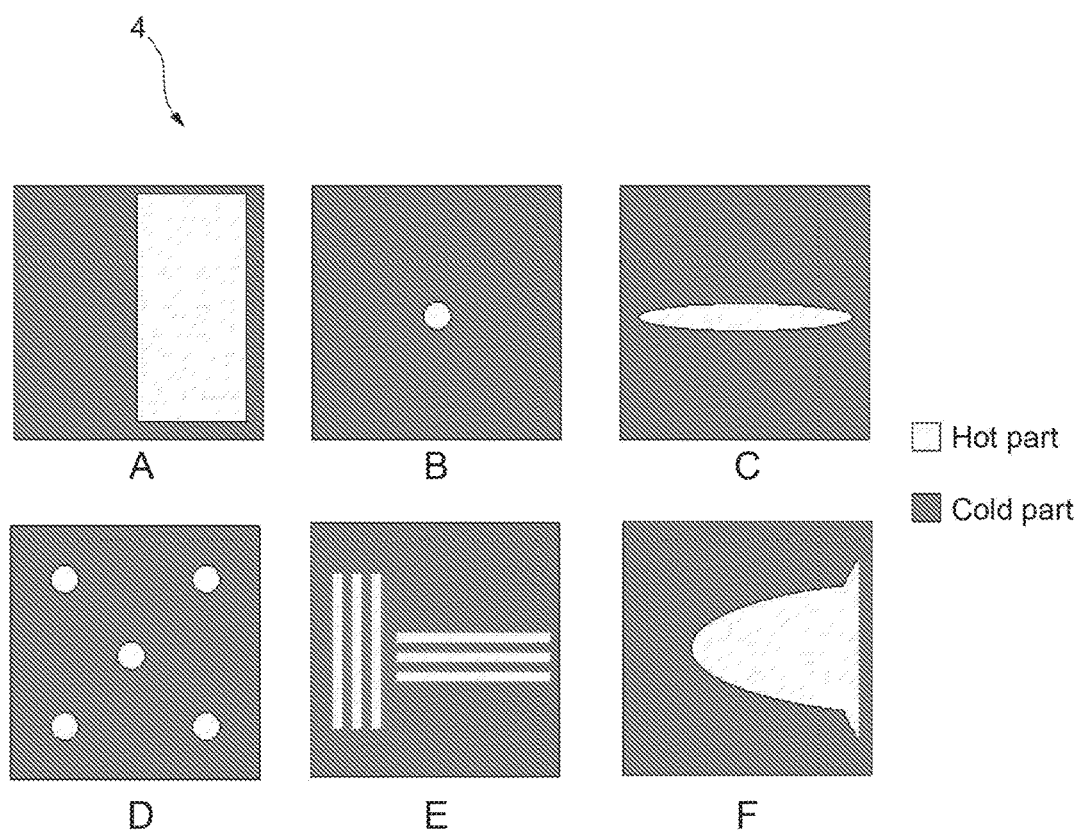
FIG. 5 shows a kit of interchangeable masks forming part of the apparatus shown in FIG. 2.

Geometric calibrations are instead those that assign, at a certain controlled x/y position of the translational platform on which the thermal-IR source 3 is mounted, a precise angular location (for example, dot-like in type B in FIG. 5) produced by the thermal-IR source 3 on the entrance pupil of the electro-optical instrument to be tested or calibrated.

Being an infrared device that, by its nature, produces EM radiations invisible to the human eye or conventional detectors, kits working in the visible bands can be expediently provided that are intended for:

identification/materialization of the optical axis and the angular directions produced by the EM radiation, materialization of the entrance pupil plane, fatally critical if not carefully identified, and accuracy and repeatability of the translations of the servo-systems assigned to moving the focal plane F.

The innovative aspects and technical advantages of the present invention may be immediately appreciated from the foregoing description, in particular:

the telecentric characteristic of the collimator 2, i.e., each section of the focal plane transfers the same energy to the UUT independently of the location of the emitting point within the UUT's FOV;

the application to cases of any kind of morphology of angularly-extending thermal IR sources;

the aptitude for use in static mode, i.e., the profile of the mask 4 projected in a specific and known position of the UUT's FOV, and in a dynamic mode, i.e., providing the focal plane F with a law of motion to cause the focal plane 3 to move along a known and precise trajectory over time, in order to simulate a transitory and repeatable radiative phenomenon;

the considerable extension of the application fields and of the testing configurations, without prejudice to the capacity to include all the testing conditions already carried out with conventional OGSE;

the mitigation of resorting to accessory apparatuses (screens, transit blocking in areas adjacent to that where testing is carried out, periodic recalibrations as the relative positions between illuminator and UUT change, etc.; in fact, the collimator 2 is sized with an angular projection margin with respect to the UUT's FOV, thereby limiting the variations in background radiation over time and in this way ensuring stability and repeatability in taking measurements;

the considerable reduction in the space necessary for carrying out testing of the UUT, as it is optically more compact (compared to the chosen focal length) with respect to conventional OGSE, constituted by offset mirror systems.

The apparatus 1 according to the present invention constitutes a system that, in the case of angularly-extending thermal-IR sources, significantly broadens the application fields of existing point projectors, with the possibility of reproducing dynamic scenarios in small, thermally-controlled spaces.

In fact, the apparatus 1 enables the reproduction of real scenarios in terms both of radiative contrast and of the related trajectories, which is difficult and laborious to trace back to simple operations of mathematical convolution of point sources.

The apparatus 1 according to the present invention is therefore assimilable to that of a high-quality IR projector, where the angular extension of the thermal-IR source can be modulated according to the form given to the masks and by the laws of motion of the targets that reproduce the operating conditions of transitory (dynamic) phenomena over time.

The application fields of the invention are numerous and heterogeneous within the scope of the optical-performance characterizations of a UUT.

The main application fields are summarized below:

UUT quality testing for the measurement of its paraxial parameters (focal length, distortion, effective FOV, etc.);

UUT quality testing for the measurement of space resolution parameters, such as the Modulation Transfer Function (MTF) and Encircled Energy (EE), i.e., the normalized energy circumscribed in the size of a pixel of a radiometric or image sensor, as well as radiometric resolution parameters, such as the Minimum Resolvable Temperature Difference (MRTD);

UUT quality testing when simultaneously illuminated by extended bodies (the scene) and point bodies (for example, the sun superimposed on the observed scene);

laboratory apparatuses for "focusing" operations in the UUT AIT/AIV phases;

simulators of real static and dynamic (over time) radiometric scenarios for civil, space and military uses; and robustness validation of UUTs' image recognition algorithms.

Finally, it is important to stress that the present invention overcomes the previously described limits of existing OGSE, preserving the characteristics thereof and embracing all the existing functionality thereof, but considerably extending the performance, with performance/cost/size benefits.

In conclusion, it is clear that various modifications can be applied to the present invention without departing from the scope of the invention as defined in the appended claims.

The invention claimed is:

1. A geometric and radiometric calibration and test apparatus for electro-optical thermal-IR instruments and designed to simulate different angularly-extending thermal-IR sources with different geometries and with thermal-IR emissions containing different hot-cold transitions;

the geometric and radiometric calibration and test apparatus comprises:

an IR collimator having an optical axis, a focal plane, and a focal length;

a thermal-IR source controllably movable relative to the collimator to be arrangeable and displaceable in the focal plane of the collimator, and operable to radiate towards the collimator thermal-IR radiations, and a kit of masks interchangeably arrangeable in front of the thermal-IR source to provide the wavefront of the thermal-IR radiations from the thermal-IR source with geometric and radiometric properties such as to cause the thermal-IR radiations reproduced on the electro-optical instrument to be calibrated or tested to contain different hot-cold transitions, wherein the thermal-IR source is computer controlled to move, together with the kit of masks arranged in front of the thermal-IR source, along the optical axis of the IR collimator to compensate for variations in the focal length of the IR collimator due to temperature changes.

2. The apparatus of claim 1, wherein the collimator is so sized as to be telecentric.

3. The apparatus of claim 1, wherein the collimator comprises a pair of spherical positive meniscus lenses with concave surfaces facing the thermal-IR source and the electro-optical instrument to be calibrated or tested, respectively.

4. The apparatus of claim 3, wherein the meniscus lenses of the collimator are made of high electrical and thermal conductivity optical germanium.

5. The apparatus of claim 1, wherein the thermal-IR source is computer-controlled to move also along a tangential direction and a sagittal direction normal to the optical axis of the collimator.

6. The apparatus of claim 5, wherein the thermal-IR source comprises a Peltier cell with a hot side facing the collimator.

7. A method comprising:

applying the apparatus according to claim 1 to simulate angularly-extending thermal-IR sources with different geometries and with thermal-IR emissions containing different hot-cold transitions for the geometric and radiometric calibration and testing of electro-optical thermal-IR instruments.

8. A geometric and radiometric calibration and test apparatus for electro-optical thermal-IR instruments and designed to simulate different angularly-extending thermal-IR sources with different geometries and with thermal-IR emissions containing different hot-cold transitions;

the geometric and radiometric calibration and test apparatus comprises:

an IR collimator having an optical axis and a focal plane;

a thermal-IR source controllably movable relative to the collimator to be arrangeable and displaceable in the focal plane of the collimator, and operable to radiate towards the collimator thermal-IR radiations, and a kit of masks interchangeably arrangeable in front of the thermal-IR source to provide the wavefront of the thermal-IR radiations from the thermal-IR source with geometric and radiometric properties such as to cause the thermal-IR radiations reproduced on the electro-optical instrument to be calibrated or tested to contain different hot-cold transitions, wherein the thermal-IR source is movable along the optical axis of the collimator, and along a tangential direction and a sagittal direction normal to the optical axis of the collimator, wherein the thermal-IR source is thermally stabilized by a specular concave surface with a low emissivity in the thermal-IR and that acts both as a heat dissipater and as a Coblenz cavity condensing the thermal-IR radiation emitted by the collimator, so contributing to the formation of a cold background with respect to the thermal-IR source.

9. A geometric and radiometric calibration and test apparatus for electro-optical thermal-IR instruments and designed to simulate different angularly-extending thermal-IR sources with different geometries and with thermal-IR emissions containing different hot-cold transitions;

the geometric and radiometric calibration and test apparatus comprises:

an IR collimator having an optical axis and a focal plane;

a thermal-IR source controllably movable relative to the collimator to be arrangeable and displaceable in the focal plane of the collimator, and operable to radiate towards the collimator thermal-IR radiations, and a kit of masks interchangeably arrangeable in front of the thermal-IR source to provide the wavefront of the thermal-IR radiations from the thermal-IR source with geometric and radiometric properties such as to cause the thermal-IR radiations reproduced on the electro-optical instrument to be calibrated or tested to contain different hot-cold transitions, wherein the masks are so shaped as to directionally apodize the different hot-cold transitions projected on the electro-optical instrument to be calibrated or tested, when the masks are moved in the focal plane together with the thermal-IR source.

10. The apparatus of claim 9, wherein the masks are so shaped as to simulate different morphologies of thermal-IR sources comprising:

an angularly-extending thermal-IR source representing a sharp hot/cold transition, a thermal-IR point source, a modulated thermal-IT source having a cosine-type projective function, a multipoint source, and a multi-pattern source.

* * * * *